(12) United States Patent
Moore (10) Patent No.: US 8,749,765 B2
(45) Date of Patent: Jun. 10, 2014

(54) APPLICATION USING A SINGLE PHOTON AVALANCHE DIODE (SPAD)

(75) Inventor: John Kevin Moore, Edinburgh (GB)

(73) Assignee: STMicroelectronics (Research & Development) Limited, Marlow Bucks (GB)

( * ) Notice: Subject to any disclaimer, the term of this patent is extended or adjusted under 35 U.S.C. 154(b) by 69 days.

(21) Appl. No.: 13/306,541

(22) Filed: Nov. 29, 2011

(65) Prior Publication Data

US 2012/0133921 A1 May 31, 2012

(30) Foreign Application Priority Data

Nov. 30, 2010 (GB) .................................. 1020275.2

(51) Int. Cl.
*G01P 3/36* (2006.01)
(52) U.S. Cl.
USPC .......... 356/28; 356/3.01; 356/4.01; 356/5.01; 356/28.5
(58) Field of Classification Search
USPC ................................. 356/3.01–139
See application file for complete search history.

(56) References Cited

U.S. PATENT DOCUMENTS

| | | | | |
|---|---|---|---|---|
| 4,158,853 A * | 6/1979 | Sullivan et al. | | 348/157 |
| 4,822,042 A * | 4/1989 | Landsman | | 473/463 |
| 5,226,650 A * | 7/1993 | Suttner | | 473/463 |
| 6,042,483 A * | 3/2000 | Katayama | | 473/199 |
| 6,580,496 B2 * | 6/2003 | Bamji et al. | | 356/5.1 |
| 6,587,186 B2 | 7/2003 | Bamji et al. | | |
| 7,133,739 B2 | 11/2006 | Williamson et al. | | |
| 7,262,402 B2 * | 8/2007 | Niclass et al. | | 250/214.1 |
| 7,301,608 B1 | 11/2007 | Mendenhall et al. | | 356/4.01 |
| 7,547,872 B2 | 6/2009 | Niclass et al. | | |
| 7,684,020 B1 * | 3/2010 | Marti et al. | | 356/28 |
| 8,355,117 B2 * | 1/2013 | Niclass | | 356/4.01 |
| 2002/0007676 A1 | 1/2002 | Ward et al. | | 73/493 |
| 2004/0032970 A1 * | 2/2004 | Kiraly | | 382/103 |
| 2004/0046741 A1 | 3/2004 | Low et al. | | |
| 2006/0008116 A1 * | 1/2006 | Kiraly et al. | | 382/103 |
| 2006/0086896 A1 | 4/2006 | Han | | |
| 2006/0189398 A1 | 8/2006 | Zanzucchi et al. | | 473/151 |
| 2006/0192086 A1 | 8/2006 | Niclass et al. | | |
| 2007/0182949 A1 * | 8/2007 | Niclass | | 356/3 |
| 2007/0197314 A1 * | 8/2007 | York et al. | | 473/407 |

(Continued)

FOREIGN PATENT DOCUMENTS

| | | |
|---|---|---|
| CN | 202032994 U | 11/2011 |
| DE | 10063694 A1 | 7/2002 |

(Continued)

OTHER PUBLICATIONS

Geiger-Mode Avalanche Photodiodes for Three-Dimensional Imaging, Aull et al. Feb. 11, 2002, Lincoln Laboratory Journal.*

(Continued)

*Primary Examiner* — Isam Alsomiri
*Assistant Examiner* — Assres H Woldemaryam
(74) *Attorney, Agent, or Firm* — Allen, Dyer, Doppelt, Milbrath & Gilchrist, P.A.

(57) ABSTRACT

A sporting device may include a proximity detector, and a housing for carrying the proximity detector. The proximity detector may comprise a single photon avalanche diode for measuring the speed of an object struck by the housing. For example, the housing may define a tennis racket.

17 Claims, 4 Drawing Sheets

(56) References Cited

U.S. PATENT DOCUMENTS

| | | | | |
|---|---|---|---|---|
| 2007/0228358 A1* | 10/2007 | Ofek | | 257/21 |
| 2008/0156993 A1* | 7/2008 | Weinberg et al. | | 250/363.03 |
| 2008/0297487 A1 | 12/2008 | Hotelling et al. | | |
| 2009/0029793 A1 | 1/2009 | Cage | | 473/324 |
| 2009/0039068 A1 | 2/2009 | Boutwell | | |
| 2010/0133636 A1* | 6/2010 | Richardson et al. | | 257/438 |
| 2010/0156830 A1 | 6/2010 | Homma et al. | | |

FOREIGN PATENT DOCUMENTS

| | | | | |
|---|---|---|---|---|
| DE | 10257955 | A1 | 7/2004 | |
| EP | 1622093 | A1 | 2/2006 | |
| EP | 1688746 | * | 8/2006 | G01P 7/00 |
| EP | 2071433 | A2 | 6/2009 | |
| EP | 2107455 | A1 | 10/2009 | |
| EP | 2144303 | A1 | 1/2010 | |
| EP | 2145656 | | 1/2010 | A63B 53/00 |
| EP | 2149755 | A1 | 2/2010 | |
| ES | 2162733 | A1 | 1/2002 | |
| GB | 2267584 | A | 12/1993 | |
| GB | 2306825 | | 5/1997 | G01S 17/10 |
| GB | 2473449 | A | 3/2011 | |
| GB | 2484077 | A | 4/2012 | |
| GB | 2486164 | A | 6/2012 | |
| JP | 11253319 | A | 9/1999 | |
| WO | 03/074137 | | 9/2003 | A63B 69/38 |
| WO | 2005/094953 | | 10/2005 | A63B 69/36 |
| WO | 2010081652 | A1 | 7/2010 | |

OTHER PUBLICATIONS

Object detection system using SPAD proximity detectors, Stark et al. 2011, Proc. of SPIE vol. 8167 81672A-1.*

Albota et al. Nov. 2, 2002, Lincoln Laboratory Journal, vol. 13, 'Three-Dimensional Imaging Laser Radars with Geiger-Mode Avalanche Photodiode Arrays'.*

* cited by examiner

APPLICATION USING A SINGLE PHOTON AVALANCHE DIODE (SPAD)

FIELD OF THE INVENTION

The present disclosure relates to an application for a single photon avalanche diode (SPAD).

BACKGROUND OF THE INVENTION

A SPAD is based on a p-n junction device biased beyond its breakdown region. The high reverse bias voltage generates a large enough electric field such that a single charge carrier introduced into the depletion layer of the device can cause a self-sustaining avalanche via impact ionization. The avalanche is quenched, either actively or passively to allow the device to be "reset" to detect further photons. The initiating charge carrier can be photo-electrically generated by a single incident photon striking the high field region. It is this feature which gives rise to the name "Single Photon Avalanche Diode." This single photon detection mode of operation is often referred to as Geiger Mode.

U.S. Pat. No. 7,262,402 to Niclass et al. discloses an imaging device using an array of SPADs for capturing a depth and intensity map of a scene, when the scene is illuminated by an optical pulse. U.S. Patent Application No. 2007/0182949 to Niclass discloses an arrangement for measuring the distance to an object. The arrangement uses a modulated photonic wave to illuminate the object and an array of SPADs to detect the reflected wave. Various methods of analysis are disclosed to reduce the effects of interference in the reflected wave.

There are approaches that measure a speed of a ball in a game, which may use expensive video equipment and often multiple cameras. Similarly, it may be difficult to measure the speed of the swing of a racket, golf club, or other sports equipment. There are a number of reasons why it would be useful to determine the speed of a ball in motion. For example, the measurements could help in devising training plans, comparative analysis, or entertainment.

SUMMARY OF THE INVENTION

It is an object of the present disclosure to provide an approach to at least some of the problems associated with the prior art.

It is an object of the present disclosure to provide a method for measuring the speed of a ball.

It is an object of the present disclosure to provide a SPAD as a solid state photo-detector for ranging, proximity detection, and accelerometer usage etc.

One such application where SPAD range detection and proximity detection can be used is the determination of the speed of an object struck by sports equipment.

According to one aspect, a proximity detector may measure the speed of an object struck by the sports equipment. Optionally, the proximity detector comprises an array of SPADs. The sports equipment may also include an illumination source. The illumination from the illumination source may be reflected by the object to the array of SPADS.

Additionally, the array of SPADs may be arranged in rows and columns. The array of SPADs may be connected to a multiplexer and a counter to enable measurement of the reflected illumination. The output from the proximity detector may be used to calculate the speed of the object based on the distance moved by the object in a predetermined time limit. The sports equipment may also include an accelerometer for compensating for the movement of the sports equipment when determining the speed of the object.

Being able to measure speed in this way may provide for an effective training plan. The measured speed can be used to compare performance with equipment to determine the best results. The measurements could be developed to provide different information for nutritional advisers, sports experts, and sports fans.

BRIEF DESCRIPTION OF THE DRAWINGS

Reference will now be made, by way of example, to the accompanying drawings, in which.

DETAILED DESCRIPTION OF THE PREFERRED EMBODIMENTS

The idea that a SPAD can be used as in a ranging application is borne out by the application of a Phase Shift Extraction Method for range determination, although alternative methods exist for range determination using SPADs based on direct time of flight (TOF) measurement. The term ranging in this application is intended to cover all ranging devices and methods including by not limited to ranging devices, proximity devices accelerometers etc. Ranging can occur in a number of applications, including proximity detection, which is relatively easy to implement and inexpensive. Laser ranging is more complex and costly than a proximity detector. Three-dimensional imaging is a high-end application that could be used to recognize gestures and facial expressions.

A proximity sensor is a ranging application. At its simplest, the sensor is capable of indicating the presence or absence of a user or object. Additional computation and illuminator complexity can provide enhanced data such as the range to an object. A typical range is of the order 0.01 m to 0.5 m. In a simple proximity sensor, the illumination source could be a modulated light emitting diode (LED), at a wavelength of about 850 nm.

The next application group is that of laser ranging, where the illumination source is a modulated diode laser. Performance can range from <1 cm to 20 m range (and higher for top end systems) with millimeter accuracy. Requirements on optics are enhanced, with hemispherical lenses and narrow band pass filters being used. A near-field return may result in the introduction of parallax error, i.e. movement of the returned laser spot over the sensor pixel array dependent on distance to object. To overcome these problems, the range device includes calibration functions to enable the subtraction of the electronic and optical delay through the host system. The illumination source wavelength should be visible so that the user can see what is being targeted and is typically around 635 nm.

The third application group is that of 3D cameras. In this application, a pixel array is used to avoid mechanical scanning of the array. Systems can be based on a number of different architectures. Both TOF and modulated illuminator based architectures are used, however, the latter is more robust to ambient light and thus fits best with established photodiode construction. Additional features, such as face and gesture recognition, are applications of this type of ranging device.

Most optical ranging implementations use either stereoscopic, structured light, direct TOF or phase extraction methods to ascertain the range to a target. Stereoscopic approaches use two typical cameras, and can have a heavy computation overhead to extract range. The structured light scheme uses diffractive optics, and the range is computed using a typical camera based on how a known projected shape or matrix of spots is deformed as it strikes the target. The direct TOF method uses a narrow pulsed laser with a time-digital converter (TDC) measuring the difference in time between transmission and first photon reception. Commonly, a "reverse mode" is employed, where the TDC measures the back-portion of time, i.e. the time from first photon reception to next pulse transmission. This scheme may minimize system activity to only the occasions where a photon is detected, and is therefore well matched to tightly controlled, low photon flux levels and medical applications, such as fluorescent lifetime microscopy (FLIM).

The phase extraction method is well suited to systems which implement computation of the generalized range equation using existing photodiode technology. It is also robust to background ambient light conditions, and may be adapted to allow for varying illuminator modulation wave-shapes (i.e. sinusoidal or square). This scheme is favored for SPADs in proximity detection applications.

The present disclosure may provide an advantage of the phase extraction method system incorporating an inherent ambient light level detection function, which can be used in conjunction with a SPAD for many applications, including measuring speed of a ball hit by a racket.

It is important to understand the range equation derivation as it indicates the ease of applicability of SPADs to phase extraction proximity detection and ranging approaches. It also aids in the understanding of inherent features, such as ambient light metering and measuring a depth of interest for a specific purpose.

Distance is determined from the speed of light and TOF, as follows:

$$s = ct.$$

Where s is distance, c the speed of light, and t is time. For a ranging system however, the distance is doubled due to the fact there are send and receive paths. As such the distance measured in a ranging system s is given by:

$$s = \tfrac{1}{2} ct.$$

The time shift component (="t"), due to the photon TOF, is dependent on the modulation frequency and phase shift magnitude of the waveform (t=% shift of the returned waveform × $t_{mod\_period}$ and if $t_{mod\_period} = 1/f_{mod}$):

$$\Rightarrow t = \frac{\phi}{2\pi} * \frac{1}{f}$$

$$\Rightarrow t = \frac{\phi}{2\pi * f}.$$

The units are in radians. Then, by substituting the above equation back into the starting equation, the "range equation" is expressed as:

$$\Rightarrow s = \frac{c * \phi}{4\pi * f}.$$

The critical component in this equation is φ, which is the unknown component of the % shift of the returned waveform. The following section discusses how this can be determined.

Figure 1:
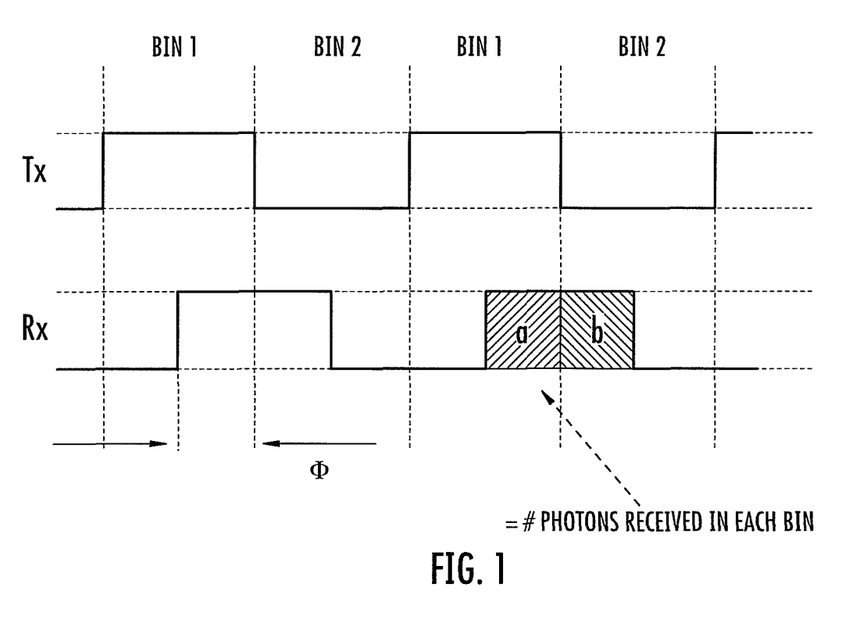
FIG. 1 is a diagram for illustrating the determination of phase shift in a SPAD, in accordance with an embodiment of the present disclosure.
Figure 2A:
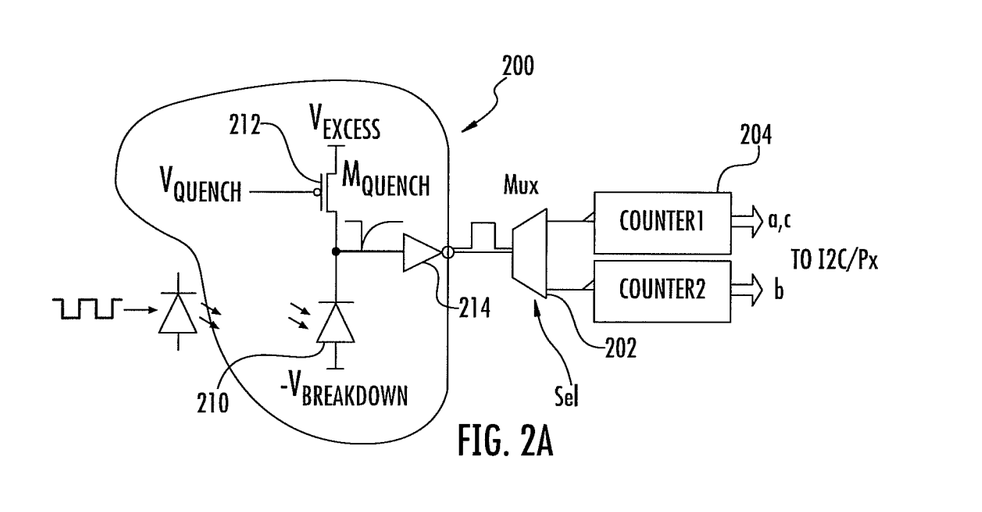
FIGS. 2A-2B are a diagram of a SPAD and an associated timing diagram, in accordance with an embodiment of the present disclosure.
Figure 2B:
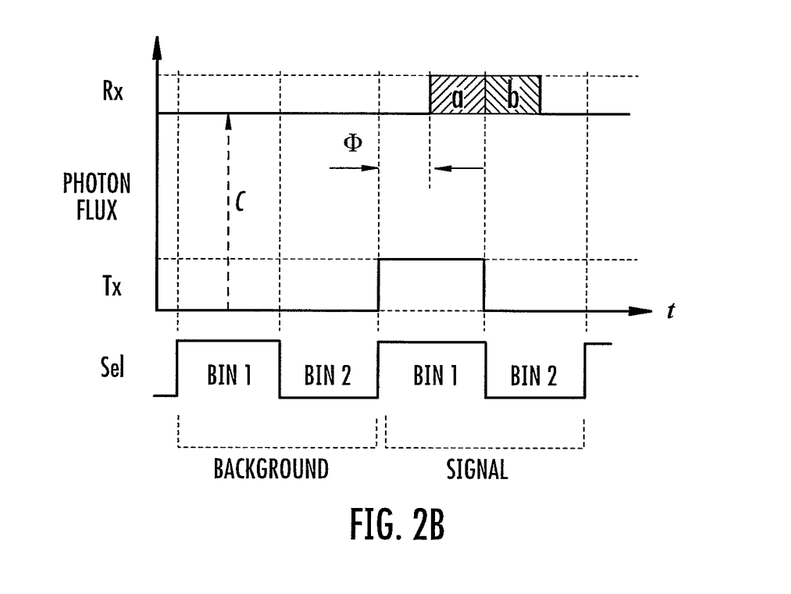

Since the values of c, f and n are all constants; the range result simply scales with φ, (the % shift of the received light waveform in relation to that which was transmitted). FIGS. 2A-2B demonstrate how φ may be determined for a system employing a square wave modulated illuminator. The transmitted and received waveforms are shifted from one another by φ. By measuring the photons that arrive in "a" and "b" in bins 1 and 2 respectively, the value of φ can be determined as follows:

$$\frac{\phi}{2\pi} = \frac{b_{count}}{(a+b)_{count}}.$$

In this type of system, there is a range limit set by the illuminator modulation frequency, which is known as the unambiguous range. Photons received from targets that are further away than this range can introduce an aliasing error by erroneously appearing in a legitimate bin for a subsequent measurement. Since determination of range is enabled by the modulation process, it is desirable to maximize the number of edges of the modulation waveform to accumulate data for averaging purposes as fast as possible. However, a high modulation frequency may lower the unambiguous range and introduces more technical complexity in the illumination source drive circuitry. Therefore, two or more different modulation frequencies may be interleaved or used intermittently, so as to reduce or negate the impact of aliased photons via appropriate data processing.

FIG. 2A illustrates a possible implementation of a SPAD based proximity sensor with an associated waveform diagram. FIG. 2A shows a SPAD 200 connected to a multiplexer 202. The output from the multiplexer passes through counters 1 and 2 (204). The SPAD device shown generally at 200 is of a standard type, including a photo diode 210, a p-type MOSFET 212 and a NOT gate 214.

The timing waveforms are shown in such a way so as to represent the relative photon arrival magnitudes. It can be seen that an extra phase has been added to enable computation of the background ambient light level offset "c," although this can be significantly reduced by the use of a narrow optical band-pass filter matched to the illumination wavelength if necessary. The element "c" is then accommodated in the computation of received light phase shift φ. The computed results for a, b, c are determined and written into either a temporary memory store or an I2C register. The computation of the phase shift φ, is calculated as follows:

$$\phi = \frac{a_{count} - c}{(a+b)_{count} - 2c}.$$

The predetermined selection of modulation frequency is performed by dedicated logic or host system that selects a suitable frequency or frequencies for the application of the range sensor. The range sensor of FIG. 2A is dependent on the amount of light that can be transmitted onto the scene, system power consumption, and the target reflectivity.

Since the system shown in FIG. 2A may need to compute the background light condition to ascertain the offset of the returned light pulse from the target, ambient light metering is included. A simplified timing scheme is employed if only the ambient light level data may be required, since the target illumination cycle is not necessary. If a narrow band IR filter is employed in the optical path, the value of c may represent only the content of the filter pass band. This can then be extrapolated to an approximation of the general ambient light conditions.

Figure 3:
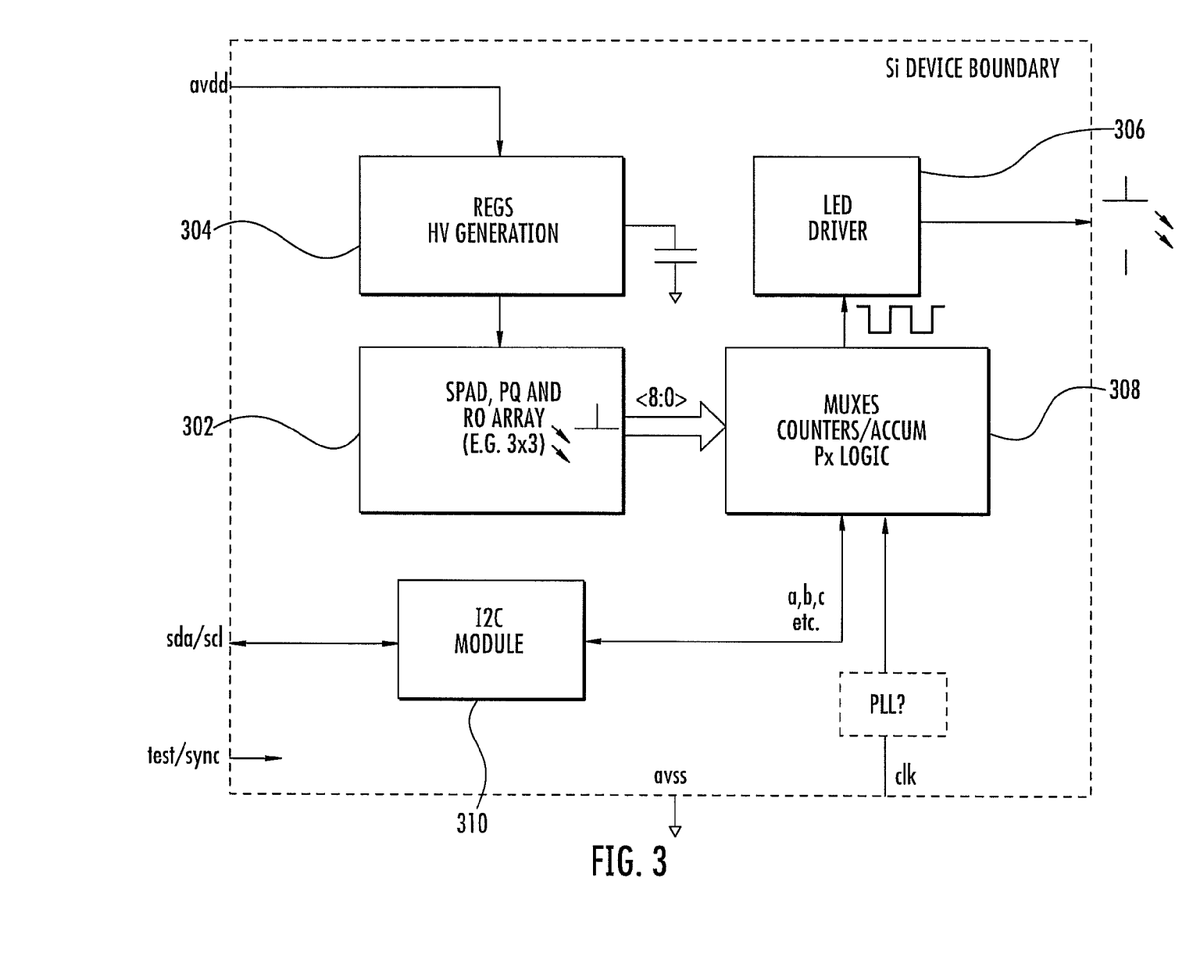
FIG. 3 is a block diagram of a proximity detector, in accordance with an embodiment of the present disclosure.

Referring to FIG. 3, a block diagram of a proximity sensor is shown. The proximity sensor 300 includes SPAD function and the quenching thereof in block 302. The quenching can be passive as shown or of any other suitable type. The bias voltage for the SPAD may be provided by a charge pump or any other suitable device 304. The sensor module also includes an LED or other illumination source and an associated driver 306 to ensure that the required modulation is applied to the illumination source.

The sensor may include a distance computation logic module to determine range. Alternatively, this can be located in a host device in which the range sensor is used. The sensor also includes multiplexers and counters 308 and a storage means 310, such as a I2C module or a store. The sensor may also include a Phase Locked Loop (PLL) for clocking and subsequent timed signal generation purposes.

The power consumption of SPADs and their readout circuits are dependent on the incident photon arrival rate. The average power consumption of a ranging system could be reduced by using power saving modes, such as pulsed on/off operation, at a rate of ~10 Hz for example, at the expense of target motion distortion.

The sensor may be implemented on a 1 mm$^2$ die size and the I2C module could also be implemented on an appropriate die. The sensor may include an optical package, an integral IR band pass filter (either coating or inherent in the optical elements) and an optimal field of view of about 30°. As the sensor is not intended to "create an image" but is instead used to ensure that as many photons as possible are detected the optics could be made from injection molded hemispherical elements.

The illuminator source should ideally be of a non-visible wavelength, for example, in the Near Infrared (NIR) band, such as 850 nm. It should be noted that the terms "optical," "illumination," and "light" are intended to cover other wavelength ranges in the spectrum and are not limited to the visual spectrum.

The proximity sensor has been described with reference to simple low cost system, although it may be appreciated for certain applications the laser ranging and 3D camera technologies discussed above, could be used. As previously indicated, the proximity sensor of the present disclosure is versatile and can be used in a vast array of different applications. One such application based on a proximity detector is now described.

Figure 4:
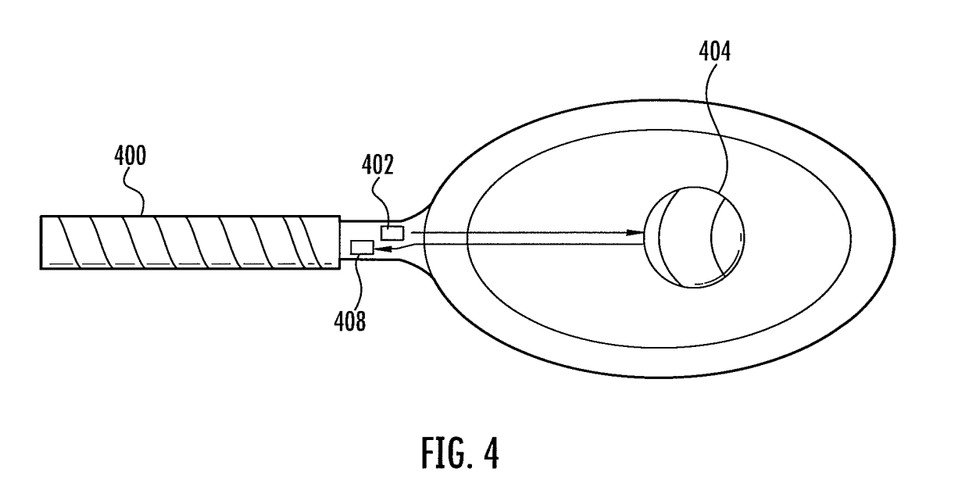
FIG. 4 is a schematic diagram of a tennis racket including a proximity detector, in accordance with an embodiment of the present disclosure.

Referring to FIG. 4, a schematic view of a tennis racket 400 is shown. The tennis racket includes a SPAD proximity detector 402. The tennis racket also includes an illumination source 408. The illumination source 408 is capable of illuminating a ball 404, which has been hit by the racket, and from which at least some of the illumination can be reflected back to the proximity detector 402. The proximity detector determines the time of impact and then detects the distance the ball has traveled within a very short time period. The time period may be in the order of nanoseconds. By keeping the time period short, the ball may still be in the field of view of the illumination source 408 and the proximity detector, despite the fact that the racket continues to move after impact. The speed of movement of the racket may need to be determined to be compensated for in the calculations. The speed of the ball is calculated in a processor associated with the proximity detector. The result of the calculation may be stored in a memory or displayed on a display. The memory or display may be remote from the racket or included in a small module in the handle, for example. In order for the components to operate, the racket may include a battery for powering those components which need power. Other forms of power could equally well be used, for example, solar power, a wind up mechanism, etc.

In an alternative embodiment, the racket may include an accelerometer which can compensate for the relative movement of the racket and the ball. However, it may still be necessary to make measurements in the same manner as described above to ensure that the ball is in the field of view of the illumination source and the proximity detector.

The present embodiments could apply to many different types of sports equipment. For example, the proximity detector could be fitted to a football or rugby boot, a golf club, a hockey stick, etc., and be used to detect the speed of any object which is struck.

The illumination source 408 is located in any appropriate location that may enable the object which is struck to be illuminated and reflection to be returned to the proximity detector. The illumination sources may include modulated light emitting diodes (LEDs), modulated lasers or any other appropriate illumination source. Similarly, the proximity detector can be located on any suitable surface or location as long as it functions as described above. It may be appreciated that many variations of the invention could apply and are intended to be encompassed within the scope of the claims.

That which is claimed is:

1. A sporting device comprising:
   a body comprising a handle portion, and a head portion extending from said handle portion and configured to impact an object, said body defining at least one of a racket, a club, a bat, and a hockey stick;
   a proximity detector carried by said body and comprising at least one Geiger mode photodetector configured to measure a speed value of the object; and
   an illumination source carried by said body and configured to generate illumination directed to an expected path of travel towards said body and to be to be reflected by the object to said at least one Geiger mode photodetector.

2. The sporting device of claim 1 wherein said at least one Geiger mode photodetector comprises an array thereof.

3. The sporting device of claim 2 wherein said array of Geiger mode photodetectors is arranged in rows and columns.

4. The sporting device of claim 1 wherein said proximity detector is configured to determine the speed value of the object based upon changes in an object range value during a time value.

5. The sporting device of claim 1 further comprising an accelerometer configured to compensate for relative movement when determining the speed value of the object.

6. A sporting device comprising:
   a body comprising a handle portion, and a head portion extending from said handle portion and configured to impact an object, said body defining at least one of a racket, a club, a bat, and a hockey stick;
   a proximity detector carried by said handle portion and comprising at least one Geiger mode photodetector configured to measure a speed value of the object; and
   an illumination source carried by said handle portion and configured to generate illumination directed to an expected path of travel towards said head portion and to be to be reflected by the object to said at least one Geiger mode photodetector.

7. The sporting device of claim 6 wherein said at least one Geiger mode photodetector comprises an array thereof.

8. The sporting device of claim 7 wherein said array of Geiger mode photodetectors is arranged in rows and columns.

9. The sporting device of claim 7 said array of Geiger mode photodetectors is operable to calculate a phase change between the transmitted radiation and the radiation reflected by the object.

10. The sporting device of claim 6 wherein said proximity detector is configured to determine the speed value of the object subsequent to the object being struck and based upon changes in a range value by the object during a time value.

11. The sporting device of claim 6 further comprising an accelerometer carried by said body and configured to compensate for movement when determining the speed value of the object.

12. A method of making a sporting device comprising: coupling a proximity detector to a body of a sporting device, the body comprising a handle portion, and a head portion extending from the handle portion and to impact an object, the proximity detector comprising at least one Geiger mode photodetector to measure a speed value of the object, said body defining at least one of a racket, a club, a bat, and a hockey stick; and coupling an illumination source to the body of the sporting device to generate illumination directed to an expected path of travel towards the body and to be reflected by the object to the at least one Geiger mode photodetector.

13. The method of claim 12 wherein forming comprises forming the at least one Geiger mode photodetector to comprise an array thereof.

14. The method of claim 13 wherein forming comprises forming the array of Geiger mode photodetectors in rows and columns.

15. The method of claim 12 further comprising programming the proximity detector to calculate a phase change between the transmitted radiation and the radiation reflected by the object.

16. The method of claim 12 further comprising programming the proximity detector to determine the speed value of the object subsequent to the object being struck by the sporting device and based upon changes in a range value by the object during a time value.

17. The method of claim 12 further comprising coupling an accelerometer to the body of the sporting device to compensate for movement when determining the speed value of the object.

\* \* \* \* \*

UNITED STATES PATENT AND TRADEMARK OFFICE
CERTIFICATE OF CORRECTION

| | | |
|---|---|---|
| PATENT NO. | : 8,749,765 B2 | |
| APPLICATION NO. | : 13/306541 | |
| DATED | : June 10, 2014 | |
| INVENTOR(S) | : Moore | |

It is certified that error appears in the above-identified patent and that said Letters Patent is hereby corrected as shown below:

In the Specification

Column 6, Line 45　　　　　　　Delete: "to be to be"
　　　　　　　　　　　　　　　Insert: --to be--

In the Claims

Column 7, Lines 1-2, Claim 6　　Delete: "to be to be"
　　　　　　　　　　　　　　　Insert: --to be--

Column 7, Line 8, Claim 9　　　Delete: "claim 7 said"
　　　　　　　　　　　　　　　Insert: --claim 7 wherein said--

Signed and Sealed this
Seventh Day of July, 2015

Michelle K. Lee
*Director of the United States Patent and Trademark Office*